United States Patent
Kang et al.

(10) Patent No.: US 9,712,088 B2
(45) Date of Patent: Jul. 18, 2017

(54) METHOD AND SYSTEM FOR CONTROLLING ELECTRICAL VACUUM PUMP

(71) Applicant: Hyundai Motor Company, Seoul (KR)

(72) Inventors: Min Jae Kang, Daegu (KR); Sung Woo Lee, Gyeonggi-do (KR); Hoon Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 4 days.

(21) Appl. No.: 14/867,146

(22) Filed: Sep. 28, 2015

(65) Prior Publication Data
US 2016/0173007 A1    Jun. 16, 2016

(30) Foreign Application Priority Data
Dec. 11, 2014    (KR) .......................... 10-2014-0178087

(51) Int. Cl.
*H02P 1/04*    (2006.01)
*H02P 1/18*    (2006.01)

(52) U.S. Cl.
CPC . *H02P 1/04* (2013.01); *H02P 1/18* (2013.01)

(58) Field of Classification Search
CPC ..................................... H02P 1/04; H02P 1/18
USPC ............ 318/430, 431, 400.03, 445; 323/213, 323/238, 243, 321
See application file for complete search history.

(56) References Cited

U.S. PATENT DOCUMENTS

| | | | | |
|---|---|---|---|---|
| 4,611,154 A | * | 9/1986 | Lambropoulos | H02P 1/04 318/434 |
| 4,738,112 A | * | 4/1988 | Nomura | B60T 17/02 303/12 |
| 5,350,992 A | * | 9/1994 | Colter | H02P 1/44 318/805 |
| 5,859,514 A | * | 1/1999 | Chouffier | H02P 1/28 318/430 |
| 5,961,189 A | * | 10/1999 | Lutteke | B60T 8/4013 188/355 |
| 5,969,957 A | * | 10/1999 | Divan | H02M 5/458 318/768 |

(Continued)

FOREIGN PATENT DOCUMENTS

JP    09-058457 A    3/1997
JP    09-294392 A    11/1997

(Continued)

*Primary Examiner* — Rita Leykin
(74) *Attorney, Agent, or Firm* — Mintz Levin Cohn Ferris Glovsky and Popeo, P.C.; Peter F. Corless (57) ABSTRACT

A control method and system of an electrical vacuum pump is provide to resolve generation of peak current when a motor of the electrical vacuum pump initially starts and implement a soft start. The electrical vacuum pump generates vacuum by suctioning air by rotating a pump with a motor. The control method includes starting the motor by supplying a power supply to the motor to switch on the electrical vacuum pump and sensing current applied to the motor using a current sensing circuit. In addition, the method includes determining a target value of motor input voltage set as a value according to the sensed applied current while starting the motor until the sensed applied current reaches a predetermined current and adjusted the motor input voltage applied to the motor to correspond to the target value.

8 Claims, 8 Drawing Sheets

(56) References Cited

U.S. PATENT DOCUMENTS

| | | | | |
|---|---|---|---|---|
| 6,650,245 | B2* | 11/2003 | Chung | H01H 9/542 318/757 |
| 6,801,021 | B2* | 10/2004 | Morrissette | H02J 7/245 322/25 |
| 7,621,721 | B2 | 11/2009 | Carboneri et al. | |
| 8,138,702 | B2* | 3/2012 | Nolemo | H02P 1/26 318/430 |
| 8,353,678 | B2* | 1/2013 | Mehlhorn | F04D 15/0066 318/455 |
| 8,415,906 | B2* | 4/2013 | Iwashita | H02M 5/4585 318/376 |
| 8,541,971 | B2* | 9/2013 | Sakai | H02P 9/009 318/400.02 |
| 8,752,475 | B2* | 6/2014 | Cunningham | B60T 17/02 303/11 |
| 8,875,529 | B2* | 11/2014 | Rollinger | F04B 27/0895 62/228.1 |
| 9,000,705 | B2* | 4/2015 | Kaidu | H02P 27/08 318/400.06 |
| 9,073,394 | B1* | 7/2015 | Clasquin | B60C 25/138 |
| 9,184,456 | B2* | 11/2015 | Imanishi | H01M 8/04552 |
| 9,337,707 | B2* | 5/2016 | Dixon | H02K 5/136 |
| 2008/0284363 | A1* | 11/2008 | Lucas | A01D 34/78 318/441 |
| 2009/0055061 | A1* | 2/2009 | Zhu | B60K 6/48 701/55 |
| 2013/0342147 | A1* | 12/2013 | Bidlingmeyer | F04B 49/065 318/430 |
| 2015/0345490 | A1* | 12/2015 | Bremeier | F04B 49/06 417/22 |

FOREIGN PATENT DOCUMENTS

| | | |
|---|---|---|
| JP | 2005-341678 A | 12/2005 |
| JP | 2009-183094 A | 8/2009 |
| JP | 2012-254788 A | 12/2012 |
| KR | 10-2002-0015478 A | 2/2002 |
| KR | 10-2006-0130163 A | 12/2006 |
| KR | 10-1302618 B1 | 9/2013 |
| KR | 10-2014-0106722 A | 9/2014 |

* cited by examiner

FIG. 1

RELATED ART

FIG. 2

RELATED ART

FIG. 3

RELATED ART

FIG. 4

RELATED ART

FIG. 5

RELATED ART

METHOD AND SYSTEM FOR CONTROLLING ELECTRICAL VACUUM PUMP

CROSS-REFERENCE TO RELATED APPLICATION

This application claims under 35 U.S.C. §119(a) the benefit of Korean Patent Application No. 10-2014-0178087 filed on Dec. 11, 2014, the entire contents of which are incorporated herein by reference.

BACKGROUND (a) Technical Field

The present invention relates to a method and system for controlling an electrical vacuum pump, and more particularly, to a method and system for controlling an electrical vacuum pump which prevents generation of peak current and implements a soft start in initial motor starting of the electrical vacuum pump.

(b) Background Art

In general, a brake device of a vehicle starts to decelerate or stop a traveling vehicle and in many passenger vehicles, a hydraulic brake is used, which generates brake force using hydraulic pressure generated by operating a brake pedal. A master cylinder that generates the hydraulic pressure from the hydraulic brake is operated by a force applied by a booster that forms a pressure difference between atmospheric pressure and vacuum pressure based on an engagement amount of the brake pedal.

For the brake booster, an air type is used, which uses pressure provided from a compressor driven by an engine to amplify operation force of the brake pedal and to provide the amplified operation force to a cylinder. Additionally, a vacuum type is widely used, which uses negative pressure of an engine intake manifold. Further, in the general vacuum type brake booster, the negative pressure of the engine intake manifold is used, but a scheme that generates vacuum of the brake booster by applying an electrical vacuum pump (EVP) using an electrical motor may be applied.

The electrical vacuum pump (EVP) is configured to suction air through a negative pressure line by rotating a pump with the electrical motor to generate vacuum in the brake booster connected through the negative pressure line and may be used for secondary vacuum generation to improve a vacuum level of the brake booster in a general engine vehicle capable of using the negative pressure of the engine intake manifold. In particular, in generating the vacuum of the brake booster using the negative pressure of the intake manifold, the electrical vacuum pump of the engine vehicle performs a vacuum supplementation function for a vacuum shortage under a high land driving condition or a turbo charger operating condition.

In particular, for a gasoline engine vehicle, an intake air amount is increased to reduce an exhaust regulation material generated in an initial cold start and since the vacuum level of the brake booster decreases, the electrical vacuum pump is used as the secondary vacuum generating apparatus. Further, when a turbo charger is applied, the vacuum level decreases in the cold start, a high load, and the high land. Therefore, the electrical vacuum pump is used as the secondary vacuum generating apparatus.

In addition, since the vacuum is generated using an atmospheric pressure difference of an intake system in the brake booster, a loss in engine output and fuel efficiency occur due to an intake loss. However, when the electrical vacuum pump is applied, a negative pressure usage of the intake manifold may be minimized, thereby achieving an effect of output and fuel efficiency gains. Further, in an electric vehicle (EV) without the engine or a hybrid electric vehicle (HEV) having a mode in which the engine stops similar to an EV driving mode, the vehicle is driven only by a drive motor.

Figure 1:
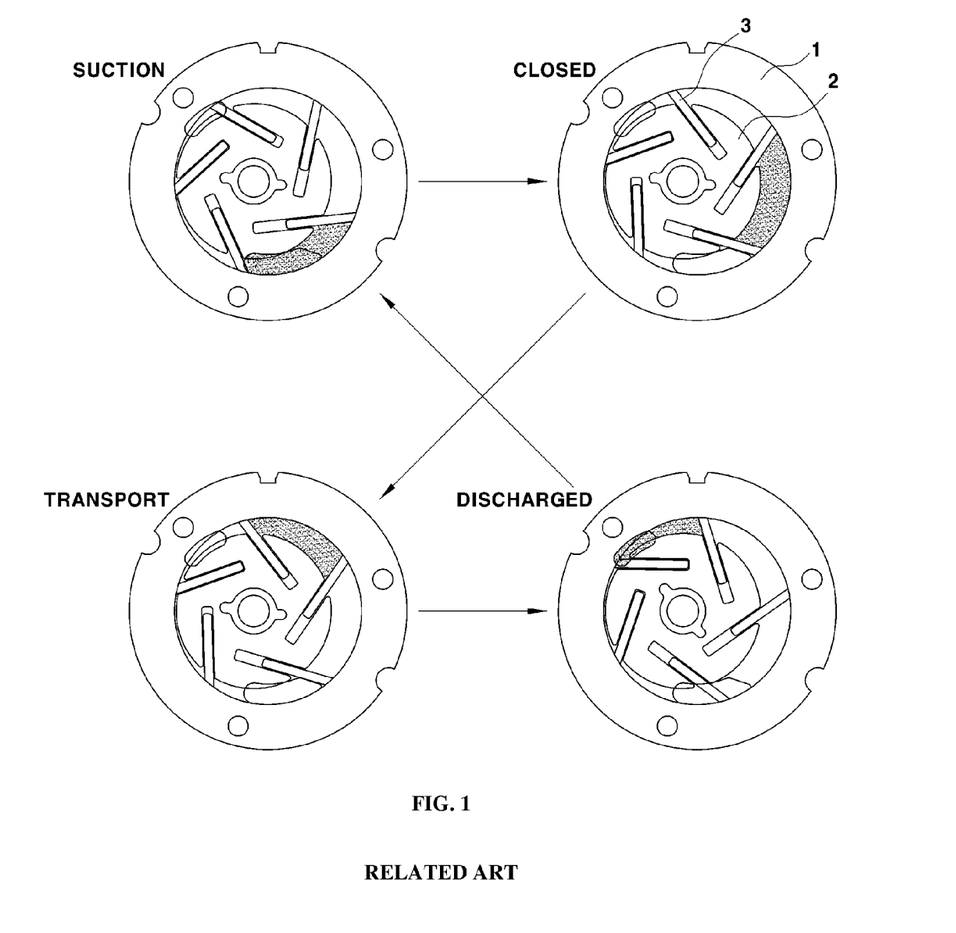
FIG. 1 is a diagram exemplifying an operation of a general electrical vacuum pump according to the related art.

FIG. 1 shows a diagram exemplifying an operation of an electrical vacuum pump (hereinafter, referred to as 'EVP') to which a vane pump type is applied and when a rotor 2 within a casing 1 is rotated using an electric motor, a surge tank of the engine and the brake booster are evacuated while air in the casing is suctioned, closed, transported, and discharged by a vane 3.

Figure 2:
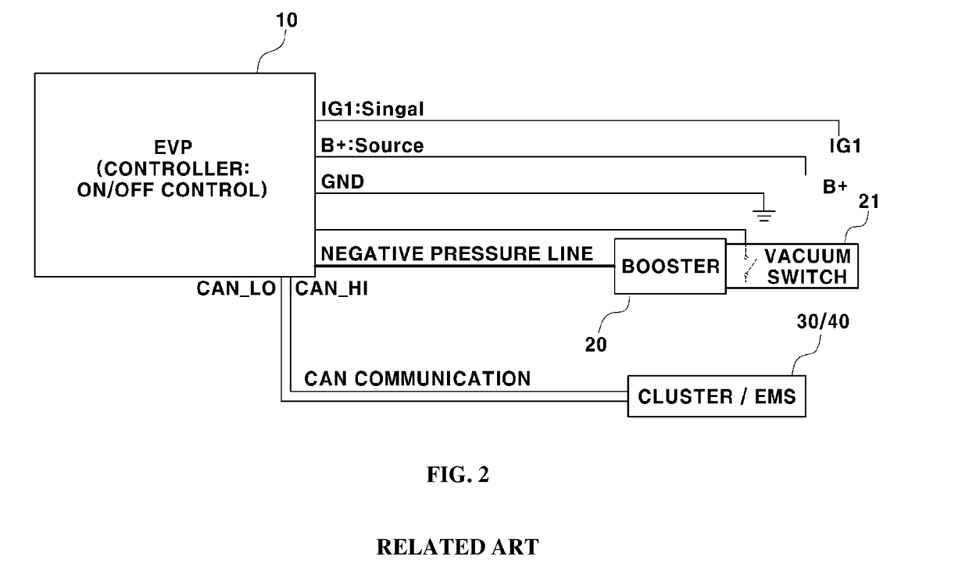
FIG. 2 is a diagram illustrating a terminal connection state of an electrical vacuum pump according to the related art.

Further, a general EVP 10 includes a ground terminal ('GND'), two controller area network (CAN) communication terminals ('CAN_HI' and 'CAN_LO'), a vacuum sensor terminal, a vehicle power signal terminal ('IG1'), and six input/output terminals of a source terminal ('B+') for driving control as illustrated in FIG. 2. Herein, the CAN communication terminals provide communication between a cluster 30 and an engine management system (EMS) 40, and the EVP 10 is used to display a failure status of the EVP 10 on the cluster 30 (e.g., a display on the cluster) and moreover, used to receive engine on/off status information from the engine management unit (EMS) 40 since the EVP is to be operated in an engine running status.

Further, the vacuum sensor terminal is used for receiving a signal (a vacuum sensor (alternatively, a vacuum switch 21) mounted on the brake booster 20 and when the vacuum sensor outputs a voltage signal depending on a vacuum degree (vacuum pressure) of the brake booster, the vacuum sensor receives the output voltage signal through the vacuum sensor terminal.

Additionally, when the vacuum switch 21 that outputs the signal based on the vacuum degree of the brake booster 20 as an on/off voltage signal is applied, a switch on signal (e.g., voltage signal) is received by force in the switch due to a pressure difference between vacuum pressure and atmospheric pressure. When the vacuum pressure ((−) pressure, that is, negative pressure) of the brake booster 20 is greater than a set level and the difference between the vacuum pressure and the atmospheric pressure is minimal, the vacuum switch 21 is in a switch-on state and when the vacuum pressure is equal to or less than the set level and the difference between the vacuum pressure and the atmospheric pressure is substantial, the vacuum switch 1 is in a switch-off state.

The vehicle power signal terminal ('IG1') is a terminal (e.g., signal terminal) used to receive an IG1 state signal and a source terminal ('B+') is a terminal used to receive battery constant power (B+). Accordingly, in the related art, the EVP is controlled to be turned on or off according to a logic based on six input/output signals and FIG. 3 is a flowchart illustrating an on/off control process of the EVP according to the related art.

Figure 3:
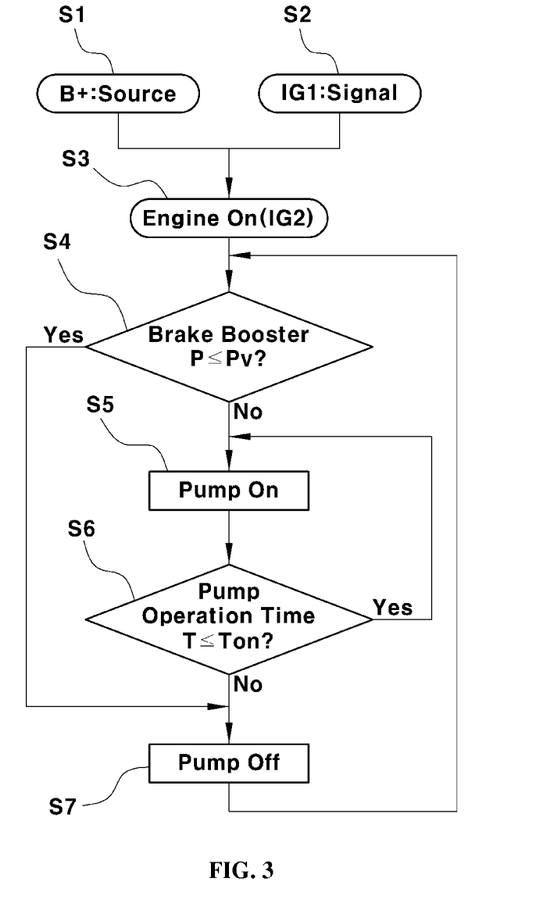
FIG. 3 is a flowchart illustrating an on/off control process of the electrical vacuum pump according to the related art.

First, as illustrated in FIG. 3, while the B+ constant power (B+ source) is connected to receive drive power (S1), an IG1 signal is received (S2) and when an engine on signal (IG2 signal) is received (S3), where pressure P of the brake booster detected by the vacuum sensor is greater than set vacuum pressure (Pv, e.g., about −250 mmHg), the EVP is turned on (S4 and S5).

Subsequently, when a set operation time (Ton) elapses, the EVP is turned off (S6 and S7). When the vacuum switch is applied, and the vacuum switch is in the switch-on state, the EVP is turned on and when the vacuum switch is in the switch-off state, the EVP is turned off. Meanwhile, when a pump driving motor is started while the EVP is turned on, high start current flows in an initial stage and FIG. 4 illustrates start current at the moment when the motor starts while switching on the vacuum switch.

Figure 4:
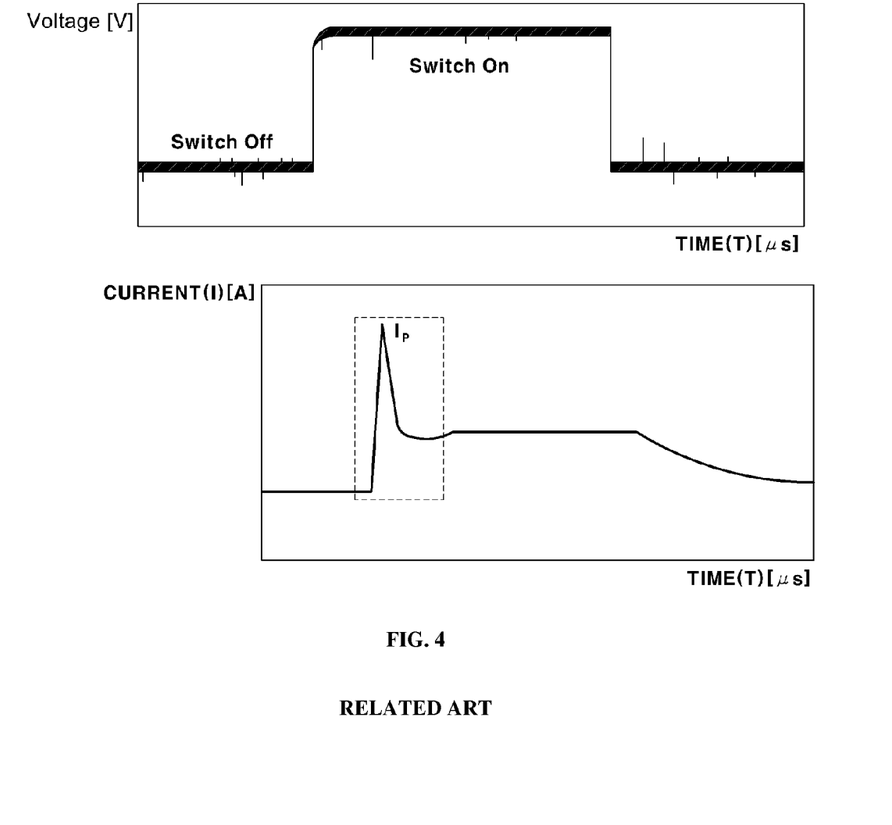
FIG. 4 is a diagram illustrating a peak current shown at the moment when a motor starts when a vacuum switch is turned on according to the related art.

As illustrated in FIG. 4, after the switch is turned on, a substantial current load is generated while starting the motor of the EVP and start current is illustrated in a peak current form, and as a result, momentary voltage drop of the vehicle power may occur and noise may be generated. In other words, when the vehicle is driven or a system (e.g., an in-vehicle controller, and the like) sharing power is operated in an initial load state in which the start current is loaded, a start time increases and the peak current during the starting of the motor increases and the momentary voltage drop of the vehicle power influences another system using the vehicle power and causes the noise generation.

Figure 5:
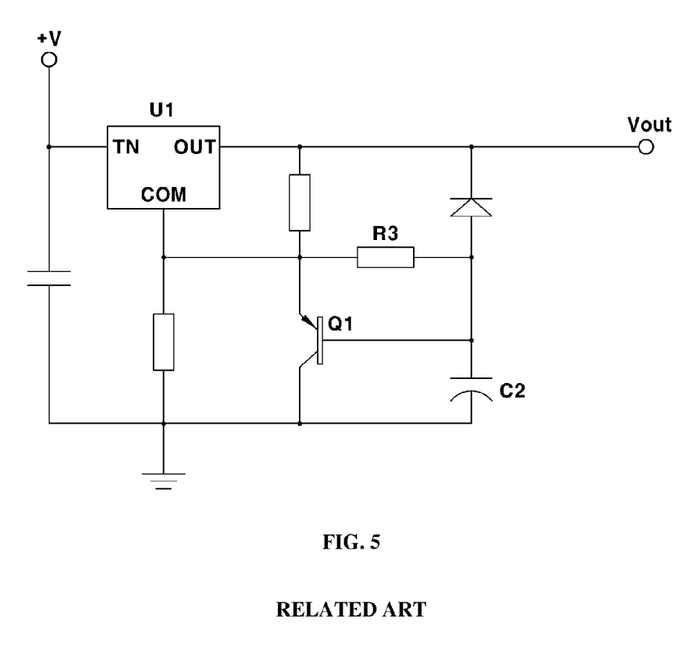
FIG. 5 is a diagram exemplifying a hardware filter circuit for removing a peak current according to the related art.

Accordingly, the source terminal (B+) of the EVP is wired with separate battery constant power to minimize the vehicle load and a hardware filter circuit is applied to suppress the noise generation and limit the start current as illustrated in FIG. 5. In the circuit of FIG. 5, '+V' represents battery voltage, 'Vout' represents filter output voltage (e.g., EVP input voltage) applied to the EVP, and reference numeral U1 represents a regulator.

When battery power is applied through the regulator U1, a capacitor C2 is discharged, and as a result, a switch Q1 operates and thus, output voltage applied to the EVP is in a low voltage state (e.g., about 1.2 V). Subsequently, when the output voltage increases while charging the capacitor C2, and as a result, the capacitor C2 is completely charged, the output voltage applied to the EVP increases substantially to remove the peak current generated during the starting. In particular, an output voltage increase time is adjusted by time constants of the capacitor C2 and a resistor R3.

However, technology to which a hardware filter is applied has a disadvantage of an increase in cost and an increase of circuit complexity due to a hardware configuration and since the time constants are determined by an output resistance value of power, linear control may be difficult. Further, the illustrated hardware filter as a noise removal filter in which an attenuation area for the peak current is fixed and patterned may not remove various load peaks caused by a vehicle environment.

The above information disclosed in this section is merely for enhancement of understanding of the background of the invention and therefore it may contain information that does not form the prior art that is already known in this country to a person of ordinary skill in the art.

SUMMARY

The present invention provides a control method of an electrical vacuum pump which may solve generation of a peak current when a motor of the electrical vacuum pump initially starts.

In one aspect, the present invention provides a control method of an electrical vacuum pump configured to generated vacuum by suctioning air by rotating a pump with a motor, the method may include: starting the motor by supplying a power supply to the motor to switch on the electrical vacuum pump; sensing current applied to the motor using a current sensing circuit; and determining a target value of motor input voltage set as a value based on the sensed applied current during the motor starting until the sensed applied current reaches a predetermined current and adjusting the motor input voltage applied to the motor to correspond to the target value.

In an exemplary embodiment, in a table, a target value of input voltage that corresponds to the applied current may be set for each time period at a predetermined time interval, and the motor input voltage may be adjusted to correspond to the target value calculated from the table based on the sensed applied current at a predetermined time interval by time-dividing a time during motor starting. In another exemplary embodiment, in the table, a target value of the input voltage may be set to be increased as the applied current is increased.

In addition, an IG1 terminal of the electrical vacuum pump may be connected to directly receive an IG1 power supply of the vehicle and the IG1 power supply applied via the IG1 terminal may be used as an operation source of the electrical vacuum pump including a signal that represents an IG1 state of the vehicle power supply and the motor.

Further, the starting of the motor may include: detecting, by a controller, an IG1 switch on state of the vehicle power supply from the IG1 power supply applied via the IG1 terminal when the vehicle power supply is in an IG1 switch on state by a starting operation of a driver; receiving, by the controller, an engine switch on signal from an engine control unit (ECU) via a CAN communication terminal of the electrical vacuum pump; and starting, by the controller, a motor start by the vehicle power supply supplied via the IG1 terminal in response to determining vacuum pressure of the brake booster which is greater than a predetermined level based on a signal of a vacuum sensor or a vacuum switch.

Therefore, according to a method for operating an electrical vacuum pump of the present invention, a motor start period may be time-divided until a final set current state after a motor is turned on to adjust EVP input voltage to correspond a target value acquired from a table for each time interval based on sensed EVP application current sensed by a current sensing circuit, and as a result, independent EVP control for external noise and look-up table (LUT) compensation control may be available and peak current may be prevented from being generated through compensation control of voltage drop even under various noise peak current generation conditions based on a vehicle load.

Further, the EVP may respond to mechanical impact and durable stress through the EVP starting control based on the time division and may be applied to all load regions, and an EVP protection function for overload, low voltage, over-voltage, low current, restraints, temperature rising delay, and the like may be reinforced. In addition, protection for voltage drop and over-current and a fundamental control for external noise may be enabled and static control which may actively respond to variable noise may be maintained by implementing the soft start. Further, noise control may be possible by applying the soft start to the EVP system of which a control range may be fixed with hardware, and a digital conversion of a noise scale may be more accurately and rapidly controlled by applying the table data (e.g., look-up table data, reference table data).

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" "and" the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

EXAMPLES

The following examples illustrate the invention and are not intended to limit the same. The present invention will be described more fully hereinafter with reference to the accompanying drawings, in which exemplary embodiments of the invention are shown. The present invention provides a control method of an electrical vacuum pump which may resolve generation of a peak current when a motor of the electrical vacuum pump initially starts and implements a soft start.

Figure 6:
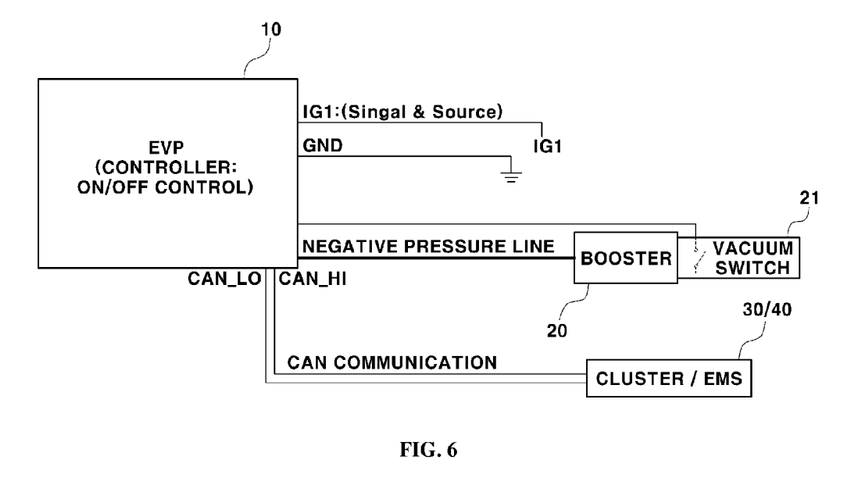
FIG. 6 is a diagram illustrating a terminal and a connection state of an electrical vacuum pump according to an exemplary embodiment of the present invention.
Figure 7:
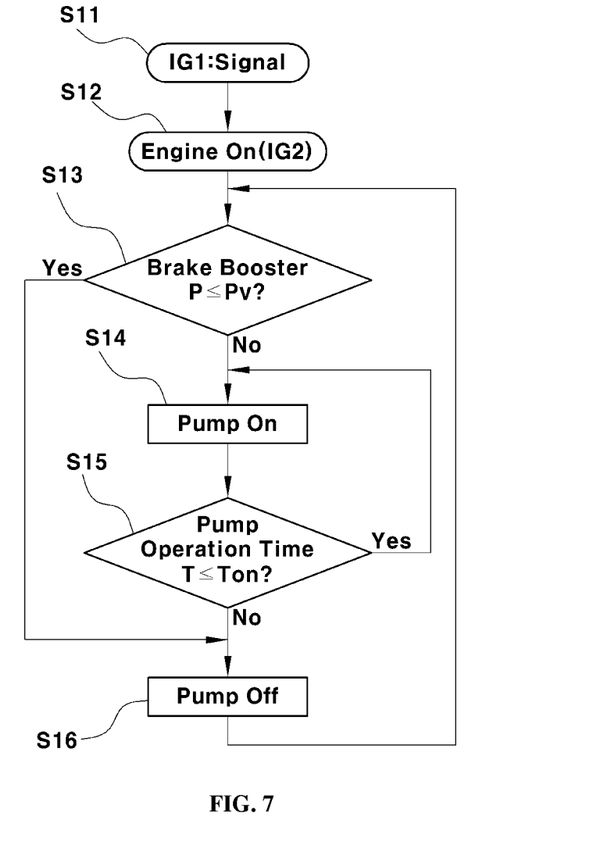
FIG. 7 is a flowchart illustrating an overall control process of the electrical vacuum pump according to an exemplary embodiment of the present invention.
Figure 8A:
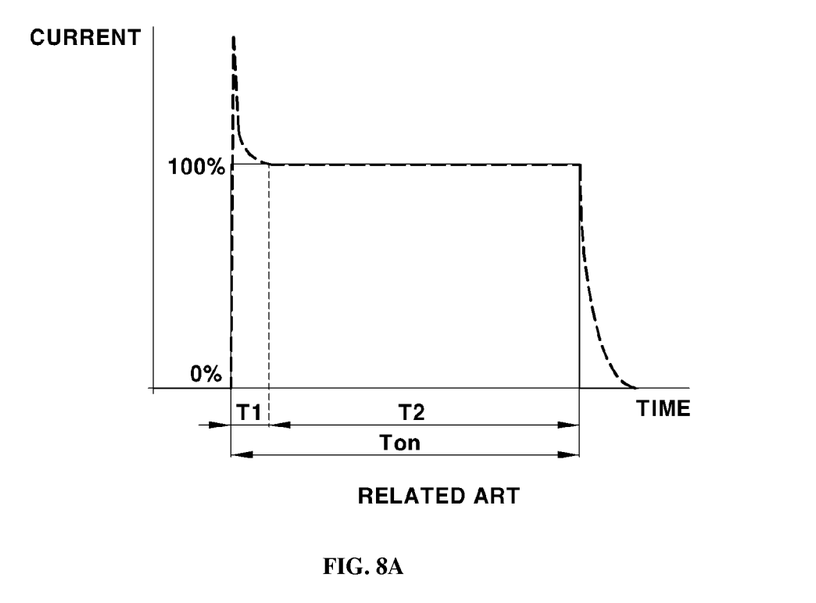
FIGS. 8A-8B are diagrams schematically illustrating a soft start applied state when the electrical vacuum pump is turned on according to an exemplary embodiment of the present invention compared with the same in the related art.
Figure 8B:
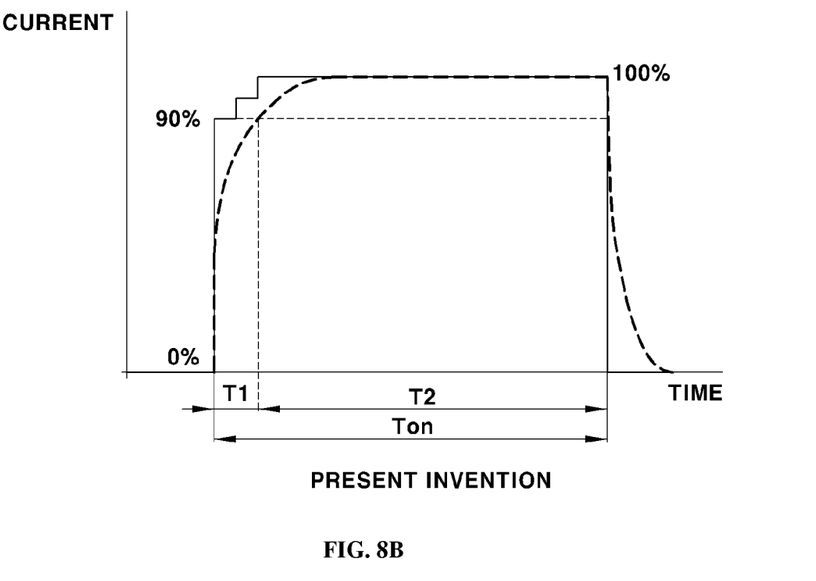
Figure 9:
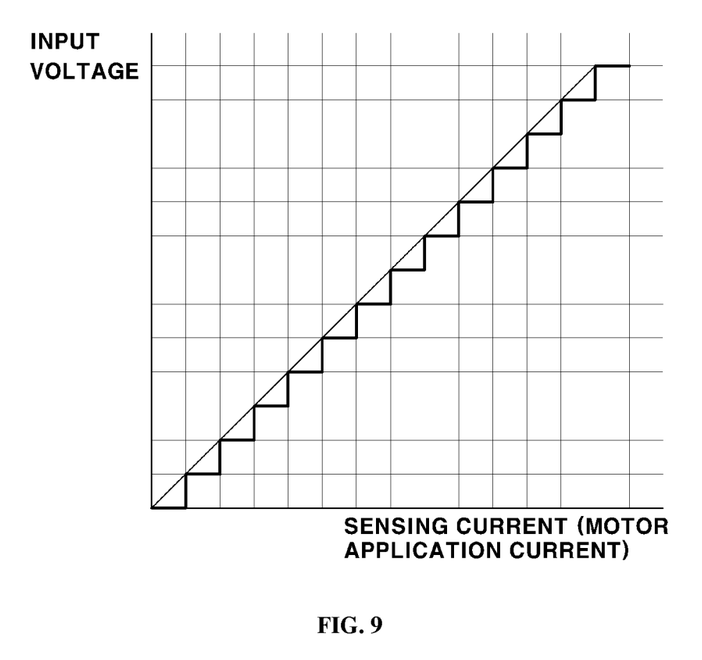
FIG. 9 is a diagram schematically illustrating a look-up table accordingly to an exemplary embodiment the present invention.

FIG. 6 is a diagram illustrating a terminal and a connection state of an electrical vacuum pump according to an exemplary embodiment of the present invention, and FIG. 7 is a flowchart illustrating an overall control process of the electrical vacuum pump. Further, FIGS. 8A-8B are diagrams schematically illustrating a soft start applied state when the electrical vacuum pump is turned on, and FIG. 9 is a diagram schematically illustrating a look-up table.

The present invention relates to a control method which may implement a soft start of an electrical vacuum pump (hereinafter, referred to as an 'EVP'), and more particularly, to a control method of a motor input voltage of the EVP which may resolve a problem that a motor current consumption in motor starting is represented in a peak form and remove a peak current in starting. First, in the EVP of the present invention, for a driving control, a ground terminal GND, two CAN communication terminals CAN_HI and CAN_LO, a vacuum sensor terminal, and five input/output terminals of a vehicle power signal terminal IG1 may be provided.

In the present invention, as described below, for applying a soft start control using a look-up table (LUT) or a reference table, similar to the related art, the number of input/output terminals may be reduced from six to five. In other words, in the related art, to apply a hardware filter, a source terminal is separately connected to a battery constant power supply B+, but in the present invention, when a driver starts a vehicle power supply in an IG1 state using a start key or a start button, an IG1 power supply may be connected to be directly received via the 'IG1' terminal.

Accordingly, to unify an IG1 signal and a source (e.g., power supply) of the EVP, one IG1 terminal is provided by integrating the IG1 terminal and the B+ terminal in the related art, wire connection is processed to apply the IG1 power supply of the vehicle via the IG1 terminal, and in an EVP controller, the IG1 power supply applied via the IG1 terminal may be used as an IG1 state signal of the vehicle power supply and an EVP operation power supply. To unify the IG1 signal and the source (e.g., power supply) of the EVP, since B+ wire connection in the related art for EVP driving is removed (e.g., reduction of the number of EVP terminals), wire costs may be reduced, and in a battery constant power supply (B+) state, noise generated during EVP operation may be removed.

Additionally, in the related art, to resolve the problem of the peak current during starting, B+ connection is added, but to apply a soft start technique of the present invention, while solving the problem of the peak current, the B+ connection is not required to be added, and the noise problem due to the B+ connection or the problem of an increase in wire connection costs may be resolved.

Referring to FIG. 7, in a control process of the electrical vacuum pump according to a vacuum degree of a brake booster, when the vehicle power supply is in the IG1 state to receive driving power, the EVP controller may be configured to determine an IG1 switch on state from the IG1 power supply applied via the IG1 terminal (an IG1 signal input state in the related art) (S11). Subsequently, when an engine on signal IG2 Signal is received (S12) by the controller, the EVP may be turned on when pressure P of the brake booster detected by a vacuum sensor is greater than predetermined vacuum pressure Pv (for example, −250 mmHg) (S13 and S14).

Moreover, when a predetermined operation time Ton elapses, the EVP may be turned off (S15 and S16). When a vacuum switch is applied, the EVP may be turned on in a switch on state and the EVP may be turned off in a switch off state. Finally, the motor starting process of the EVP may be performed by detecting an IG1 switch on state of the vehicle power from the IG1 power supply applied via the IG1 terminal when the vehicle power supply is in an IG1 switch on state by a driver's starting operation, receiving an engine on signal from an engine control unit (EMS) via the CAN communication terminal, and starting the motor start by the vehicle power supply supplied via the IG1 terminal in response to determining vacuum pressure of the brake booster which is greater than a predetermined level based on the vacuum sensor or the signal of the vacuum switch.

Furthermore, in the present invention, the soft start of the EVP motor may be implemented by a method of adjusting a voltage (hereinafter, referred to as an 'EVP input voltage') applied to the motor of the EVP by setting a voltage value calculated from the reference table as a target value based on a current value sensed by sensing a motor applied current (e.g., current consumption, hereinafter, referred to as an 'EVP applied current') of the EVP. Accordingly, a current sensing circuit (e.g., using a sensor) configured to sense the applied current applied to the motor in the EVP On may be used. The current sensing circuit is a circuit pre-applied to the inside of the EVP and may be used without adding separate hardware.

As described above, a noise removal and a hardware filter function of a fixed peak current target type in the related art may be processed with software by applying the soft start in an initial starting control of the EVP. Further, various load peak noises generated due to a vehicle environment may be removed by implementing the soft start with software which adjusts an EVP input voltage based on a motor current sensing value by using the reference table to implement a multi-filter function with software. Notably, the method as described herein may be implemented by a controller having a processor and a memory.

Hereinafter, a software control method using the reference table will be described in more detail with reference to FIGS. 8A to 9. In FIGS. 8A-8B, Ton represents an EVP on time to reach target negative pressure in the brake booster (e.g., the time required to reach the target negative pressure), T1 represents a time during motor starting in which variable control of the EVP input voltage, that is, the soft start control is performed based on a sensing current until the EVP applied current reaches a final predetermined current state, and T2 represents a holding time when the applied current after the EVP starting is maintained in a predetermined current state.

First, in FIG. 8B, when the EVP controller determines an EVP on condition from the signal of the vacuum sensor or the signal of the vacuum switch, that is, when the EVP controller determines the EVP on condition when the pressure P of the brake booster detected by the vacuum sensor is greater than the predetermined vacuum pressure or an on signal of the vacuum switch is input, to reach target negative pressure in the brake booster, the EVP may be driven (EVP On) and the EVP motor starting may be executed. In particular, the EVP controller may be configured to determine an EVP applied voltage targeted from the reference table, that is, a target value of the EVP input voltage based on the EVP applied current sensed by the current sensing circuit for each time period determined using time division in initial starting of the EVP motor and may be configured to variably adjust the EVP input voltage as a target value.

As a result, even though rapid noise current change and voltage change may be generated for a time period when the motor applied current increases during the starting of the motor, the input voltage of the motor may be adjusted at a level where the voltage change is immediately compensated. In other words, like the peak current, under a condition in which the motor applied current rapidly increases and then rapid voltage drop occurs, the compensation of the voltage change may be performed by increasing the motor input voltage in response to the rapid increase and decrease, and as a result, the current change may be adjusted to be in a gentle state (e.g., non-volatile state) compared to the starting of the related art as seen in FIG. 8A.

FIG. 9 illustrates an example of the reference table, and as illustrated in FIG. 9, in the reference table stored in the EVP controller, a target value of the input voltage may be set to be high (e.g., about 12V) as the applied current is increased, and the value of the reference table may be determined from data obtained through previous study results. Accordingly, for the motor starting time, that is, while the applied current reaches the predetermined current, the motor applied current for each time period may be adjusted to be increased step by step (e.g., stepwise as opposed to rapid), and thus, the soft start control of the motor may be achieved. In particular, a soft start control may refer to a start in which volatile variances are prevented.

As described above, in the present invention, until the motor applied current reaches the last predetermined current state after starting the motor, the EVP input voltage may be adjusted to correspond to the target value calculated from the reference table based on the EVP applied current sensed by the current sensing circuit for each time period by time-dividing the T1 period at a predetermined time interval. Accordingly, independent EVP control for external noise and look-up table (LUT) compensation control may be enabled, and a targeted motor output control may be enabled by following an LUT variance based on a time through the software processing.

Further, even under various noisy peak current generation conditions according to the vehicle load, voltage drop based on noise and the like over time may be adjusted or controlled using LUT compensation to prevent the peak current from being generated. In the soft start control method according to the present invention, the EVP may be operated by adjusted n or more ΔT and ΔV time-divided for voltage driving at various levels instead of adjusted an enable/disable signal.

Accordingly, until the EVP reaches from the initial starting to the EVP switch on state (e.g., EVP complete load state), the rapid noisy current increased and the voltage drop similar to the peak current may be limited, and the EVP may respond to noise continuously changed without an EVP output loss. Further, the EVP may respond to mechanical impact and durable stress using the EVP starting control based on the time division and may be applied to all load regions, and an EVP protection function for overload, low voltage, over-voltage, low current, restraints, temperature rising delay, and the like may be reinforced.

Additionally, protection for voltage drop and over-current and a fundamental control for external noise may be enabled by implementing the soft start, and static control which may actively respond to variable noise through control referring to the reference table stored in the memory of the controller may be maintained. Further, various cases of noise control may be possible by applying the soft start to the EVP system of which a control range may be fixed with hardware, and a digital conversion of a noise scale may be more accurately and rapidly controlled by applying the reference table data.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. A control method of an electrical vacuum pump which generates vacuum by suctioning air by rotating a pump with a motor, the method comprising:
    starting, by a controller, the motor by supplying a power supply to the motor to switch on the electrical vacuum pump;
    sensing, by the controller, current applied to the motor using a current sensing circuit; and
    determining, by the controller, a target value of motor input voltage set as a value based on the sensed applied current while starting the motor until the sensed applied current reaches a predetermined current and adjusting the motor input voltage applied to the motor to correspond to the target value,
    wherein in a reference table, a target value of input voltage that corresponds to the applied current is set for each time period at a predetermined time interval, and the motor input voltage is adjusted to correspond to the target value calculated from the reference table based on the sensed applied current at a predetermined time interval by time-dividing a time while starting the motor.

2. The method of claim 1, wherein in the reference table, a target value of the input voltage is set to be increased as the applied current is increased.

3. The method of claim 1, wherein an IG1 terminal of the electrical vacuum pump is connected to directly receive an IG1 power supply of the vehicle and the IG1 power supply applied via the IG1 terminal is used as an operation source of the electrical vacuum pump including a signal that represented an IG1 state of the vehicle power supply and the motor.

4. The method of claim 3, wherein the starting of the motor includes:
    recognizing, by the controller, an IG1 switch on state of the vehicle power supply from the IG1 power supply applied via the IG1 terminal when the vehicle power supply is in an IG1 switch on state by a starting operation of a driver;
    receiving, by the controller, an engine switch on signal from an engine control unit via a controller area network (CAN) communication terminal of the electrical vacuum pump; and
    starting, by the controller, a motor start by the vehicle power supply supplied via the IG1 terminal in response to determining vacuum pressure of the brake booster which is greater than a predetermined level based on a signal of a vacuum sensor or a vacuum switch.

5. A control system of an electrical vacuum pump which generates vacuum by suctioning air by rotating a pump with a motor, the system comprising:
    a memory configured to store program instructions; and
    a processor configured to execute the program instructions, the program instructions when executed configured to:
    start the motor by supplying a power supply to the motor to switch on the electrical vacuum pump;
    sense current applied to the motor using a current sensing circuit; and
    determine a target value of motor input voltage set as a value based on the sensed applied current while starting the motor until the sensed applied current reaches a predetermined current and adjusting the motor input voltage applied to the motor to correspond to the target value,
    wherein in a reference table, a target value of input voltage that corresponds to the applied current is set for each time period at a predetermined time interval, and the motor input voltage is adjusted to correspond to the target value calculated from the reference table based on the sensed applied current at a predetermined time interval by time-dividing a time while starting the motor.

6. The system of claim 5, wherein in the reference table, a target value of the input voltage is set to be increased as the applied current is increased.

7. The system of claim 5, wherein an IG1 terminal of the electrical vacuum pump is connected to directly receive an IG1 power supply of the vehicle and the IG1 power supply applied via the IG1 terminal is used as an operation source of the electrical vacuum pump including a signal that represented an IG1 state of the vehicle power supply and the motor.

8. The system of claim 7, wherein the program instructions when executed for the starting of the motor are further configured to:
recognize an IG1 switch on state of the vehicle power supply from the IG1 power supply applied via the IG1 terminal when the vehicle power supply is in an IG1 switch on state by a starting operation of a driver;
receive an engine switch on signal from an engine control unit via a controller area network (CAN) communication terminal of the electrical vacuum pump; and
start a motor start by the vehicle power supply supplied via the IG1 terminal in response to determining vacuum pressure of the brake booster which is greater than a predetermined level based on a signal of a vacuum sensor or a vacuum switch.

* * * * *